(12) United States Patent
Ghosh

(10) Patent No.: US 7,597,237 B2
(45) Date of Patent: Oct. 6, 2009

(54) ROTATABLE MULTI-PIN APPARATUS, AND PROCESS FOR FRICTION DRIVEN STITCH WELDING AND STRUCTURAL MODIFICATION OF MATERIALS

(75) Inventor: Amit Ghosh, Ann Arbor, MI (US)

(73) Assignee: Regents of the University of Michigan, Ann Arbor, MI (US)

( * ) Notice: Subject to any disclaimer, the term of this patent is extended or adjusted under 35 U.S.C. 154(b) by 356 days.

(21) Appl. No.: 11/409,895

(22) Filed: Apr. 24, 2006

(65) Prior Publication Data

US 2006/0273140 A1 Dec. 7, 2006

Related U.S. Application Data

(60) Provisional application No. 60/673,930, filed on Apr. 22, 2005.

(51) Int. Cl.
B23K 20/12 (2006.01)
B23K 37/00 (2006.01)
(52) U.S. Cl. ..................... 228/112.1; 228/2.1
(58) Field of Classification Search ............... 228/2.1, 228/112.1
See application file for complete search history.

(56) References Cited

U.S. PATENT DOCUMENTS 5,460,317 A 10/1995 Thomas et al.
6,290,117 B1* 9/2001 Kawasaki et al. ......... 228/112.1
6,302,315 B1* 10/2001 Thompson ................ 228/112.1
6,325,273 B1* 12/2001 Boon et al. .............. 228/112.1
6,726,085 B2* 4/2004 Litwinski et al. ......... 228/112.1
2004/0046003 A1* 3/2004 Vyas ....................... 228/112.1
2004/0074949 A1* 4/2004 Narita et al. ............. 228/112.1

FOREIGN PATENT DOCUMENTS

DE 1031689 A1 * 1/2002
GB 2306366 A * 5/1997
JP 2000094156 4/2000
JP 2003112271 4/2003

* cited by examiner

Primary Examiner—Jessica L Ward
Assistant Examiner—Devang Patel
(74) Attorney, Agent, or Firm—Marshall, Gerstein & Borun LLP

(57) ABSTRACT

A process is disclosed that creates a high shear rate in a workpiece using a head including a ring-shaped rotatable shoulder, a first pin and a second pin, both pins extending downwardly relative to the shoulder. The process includes coupling the workpiece to a table and rotating the first pin and the second pin in the same direction, wherein the first pin has a diameter, wherein a gap between the first pin and the second pin is less than the diameter. The head is plowed through the workpiece with the shoulder bearing downwardly against the workpiece and the first and second pin disposed in the first and second workpieces. The first pin rotates in a direction opposite the direction of the second pin in the gap to create a high shear rate of the workpiece within the gap.

42 Claims, 7 Drawing Sheets

*FIG. 8*      *FIG. 9*      *FIG. 10*
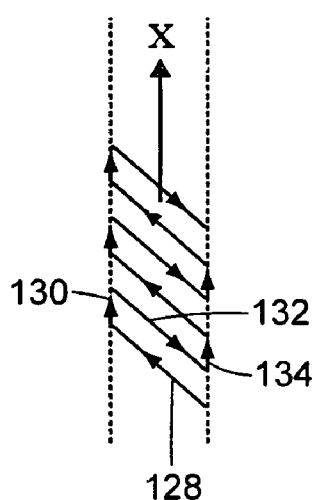
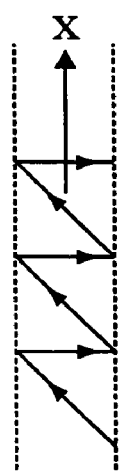
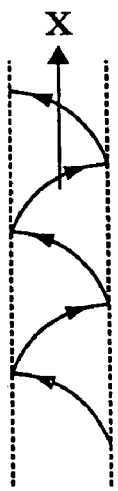
*FIG. 11*
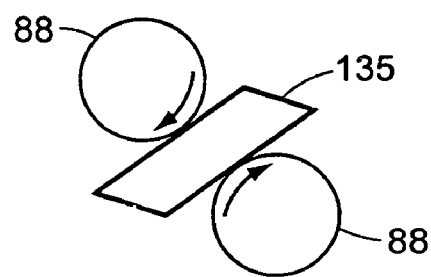

ROTATABLE MULTI-PIN APPARATUS, AND PROCESS FOR FRICTION DRIVEN STITCH WELDING AND STRUCTURAL MODIFICATION OF MATERIALS

CROSS REFERENCE TO RELATED APPLICATIONS

This application claims the benefit of U.S. Provisional Application No. 60/673,930, filed on Apr. 22, 2005.

BACKGROUND OF THE INVENTION

1. Field of the Disclosure

The present invention generally relates to processes for joining and microstructure modification of solid materials and apparatus for the same, and more particularly to a new approach to perform such tasks in a controlled manner in the solid state.

2. Description of Related Art

The process of solid state joining of metals involves transfer of atoms from one side of a metal interface to the other. Solid state joining of metals has many attractive advantages over liquid metal joining processes. It is energy efficient, cleaner, free from unsafe liquid metal spurts, does not require filler metal, eliminates hazardous gas emissions, and, therefore, is environmentally more friendly. Solid state joining produces a bonded material without cast metal zone, generally with higher mechanical integrity.

In a diffusion bonding process, the entire workpiece is heated to the bonding temperature and bonding is made over the entire interface at one time. During diffusion/deformation bonding processes, transfer of atoms at the interface occurs by microcreep of the surface asperities concomitant with transport of atoms by diffusion, aided by dislocation motion, grain boundary migration, and grain boundary sliding. In other solid state processes, e.g., ultrasonic welding and friction welding, joining occurs over a small region at one time as the welding zone moves along the interface to create a long welded length for a butt or lap weld.

The friction stir welding (FSW) process has emerged as a viable welding process for aluminum alloys, after the predecessor "friction welding" process (a rubbing process) was found to be restricted. It was reasonable to stir the joining interface to assist rapid transfer of matter from one side of the interface to the other. This process, developed by The Welding Institute and shown in FIG. 1, involves joining of two workpieces held under compressive constraint, by having a rotating tool plunged into the alloy, moving along the interface, to transfer matter from one side of the interface to the other as it moves forward.

The basic understanding of the mechanics of the FSW process is expressed by the following statement from The Welding Institute: "FSW process joins materials by plasticizing and then consolidating the material around the joint line. First, a hole is pierced at the start of the joint with a rotating steel pin. The pin continues rotating and moves forward in the direction of welding. As the pin proceeds, the friction heats the surrounding material and rapidly produces a plasticized zone around the pin. Pressure provided by the pin forces plasticized material to the rear of the pin where it consolidates and cools to form a bond. No melting occurs in this process, and the weld is left in a fine-grained, hot-worked condition with no entrapped oxides or gas porosity." While this understanding is generally accepted, as shown by the heated region and the mass transfer lines in FIG. 1, the presence of the plasticizing region obscures to some extent the critical features regarding the mechanics of transfer of atoms from one interface to the other, and porosity and cracks can form.

In FSW, metal is physically moved from one side of the interface to the other through shear displacements induced in the workpiece by the rotating tool. The rise in temperature due to frictional heating softens the workpiece to enhance shearing rate. Work hardening, diffusion, and recrystallization across the interface are other concurrent effects. This rise in temperature, an integral part of the process, also accelerates chemical reactions between tool material and the workpiece, adhesion, wear, and damage to the apparatus.

Heat evolution in the welding zone is due to two primary components: (i) friction and (ii) plastic deformation of the metal. These are interdependent variables. A reduction in the flow stress of the workpiece due to heating reduces the frictional shear resistance experienced by the apparatus. Thus, a key to reducing damage to the apparatus due to friction is to develop efficient deformation heating process of the material transferred across the interface. If the efficiency of plastic work input is increased, then available tool power transfers material across the interface with great speed, or in the alternative, the process could be completed at lower power.

Incremental advances in improving the material of construction of the conventional FSW apparatus and in improving complex procedures continue to emerge, but it is becoming increasingly evident that the current processes and apparatus for FSW are less than optimum in various ways. Recent analytical studies show that the energy imparted from the prior art working apparatus is not used efficiently in softening the region of the workpiece, or in transferring matter across the interface, where joining is taking place, but is lost to a great extent in the surrounding material.

For a single pin FSW process, the cross-sectional area of a workpiece increases radially outward from the apparatus axis, the shearing displacement imparted at the interface is rapidly attenuated as a function of radial distance from the interface. This means that a viscous plasticized zone is developed only near the tool interface, even though a plastic zone surrounding the pin extends to a large distance. Thus, the plasticized zone is much smaller in size than the plastic zone, which extends all the way to the elastic-plastic boundary. This situation is illustrated in FIGS. 2a and 2b, which graphically depict the shear strain relative to the distance from the pin. As can be seen, the plasticized region is near the pin, and a great amount of shear strain is developed. However, in the tail of the shear strain distribution (the edge of the elastic plastic boundary), which is a large volume of material, a substantial amount of deformation work is spent away from the tool and away from the interfaces to be joined. Furthermore, because heat dissipation by conduction increases with increasing sectional area from the tool axis in a similar manner, loss of heat around the rotating tool occurs rapidly.

Model calculations are still evolving, but are not sufficiently focused on the problem. Nevertheless, the weakness of the present FSW approach is obvious from the above discussion, i.e., the bulk of the workpiece material uses much of the energy imparted by the apparatus with only small fraction aiding the region to be welded.

Furthermore, FSW of high temperature alloys, such as Fe and Ni base alloys, is considerably more difficult than aluminum because, as the pin tries to "plasticize" a significant volume of the high melting alloy, excessive tool wear and reaction damage occurs at the very high temperatures generated during the process. This leads to prematurely discarding expensive tools. Even though exotic tool materials such as polycrystalline cubic boron nitride, W—Re alloys, and ceramic tooling are being examined by welding high temperature alloys, these expensive tool materials are easily damaged because of their brittleness and the high forces encountered in the process.

Finally, in conventional FSW, pores tend to be created in the weld by the vortices created during stirring. Despite high pressure experienced by the FSW tool, there is not a direct attempt to close porosity.

Stirring in the interior of materials automatically introduces deformation to subdivide grain structure, and provide opportunity to add particulates of a second phase between the grains undergoing shearing and mixing, to produce chemical changes or to form a composite type of microstructure. These aspects are not adequately controlled in prior art processes but can be better controlled by practicing the invention described below.

BRIEF DESCRIPTION OF THE DRAWINGS

Objects, features, and advantages of a friction-driven stitch welding ("FDSP") machine and process in accordance with the teachings of the present invention will become apparent upon reading the following description in conjunction with the drawing figures, in which:

FIGS. 8-10 show examples of paths that the welding head may take relative to the workpieces.

FIG. 11 shows shear distribution from the two pin head of FIG. 4.

DETAILED DESCRIPTION OF THE DISCLOSURE

Figure 1:
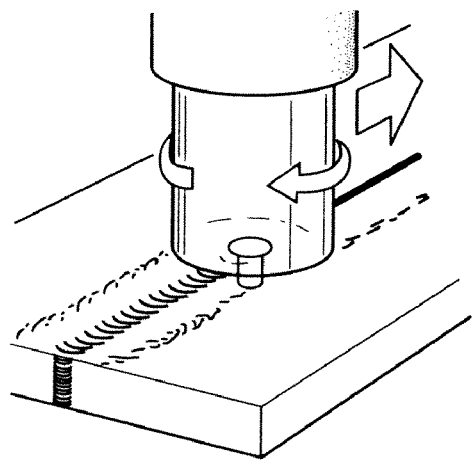
FIG. 1 shows a prior art single pin friction stir welding apparatus.
Figure 2A:
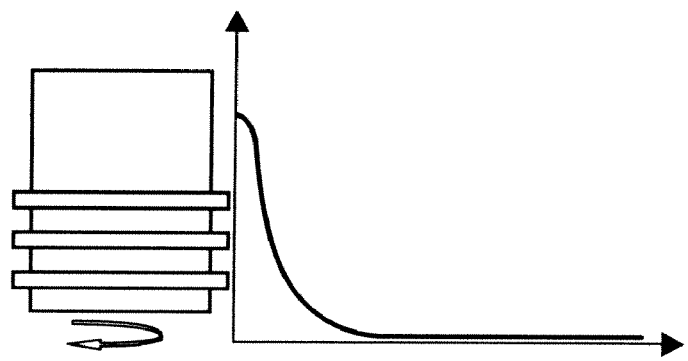
FIGS. 2a and 2b show work performed by the single pin prior art friction stir welding apparatus of FIG. 1.
Figure 2B:
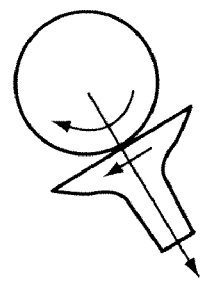

The disclosed device is directed to a new and efficient process for solid state joining of metals that addresses the inefficiencies in present-day FSW technology. FSW has gained considerable attention in recent years in the successful welding of aluminum alloys, but concerns exist in applying FSW to higher melting point metals because of excessive heating of the apparatus, chemical reactions, wear, and simply fracture of the expensive apparatus.

The disclosed welding device focuses the high plastic shear rate near the interface region of the workpiece undergoing joining within a narrow zone by using two or multiple rotating pins, and by defining that zone by the distance between the rotating pins of the two-pin head or a multi-pin head. Instead of relying on the size of plastic zone that develops naturally by the material's own strain hardening ability, this zone is intentionally controlled to be only a millimeter or few millimeters wide by controlling the spacing between the pins. The shearing zone volume is confined into a narrow band and shear traction is applied on both sides of this thin zone possible only when the closely-spaced pins rotate in the same direction about their own axes. The shear strain distributions superpose to enhance the local deformation rate many times in the region where material transfer occurs. This produces a rapid friction-driven transfer of material across interfaces to be joined. A relative motion between workpiece and apparatus is introduced in which the apparatus traverses along a weld line while oscillating about the interface line so the material on the interface is made to travel in a criss-cross fashion creating a stitching-like pattern across the interface. Repeatedly varying the shearing axis direction of travel causes cyclic weakening of the material due to alternating stresses imposed in the transverse direction of overall travel of the weld head. This process takes advantage of the unique material softening property together with the higher shear rate between the pins. The contribution of these two effects causes breakdown of the grain structure of the metals and produces a refined grain structure. This refined grain structure can lower deformation resistance.

In a second disclosed example, the new apparatus and methodology is applicable to Friction Stir Processing ("FSP") to alter the structure of metal near its surface and/or in the interior. In this example, a multi-pin tool head is used for surface treatment of metals. Again, the pin rotation can be arranged such that on either side of the gap between the pins, the shearing traction is in opposite direction possible only when the pins rotate in the same direction about their own axes. In this method, the second workpiece may be considered a layer of fine solid particulates applied on the top surface of the first workpiece, i.e. on the same surface on which the multi-pin tool is applied. Other methods of adding particulates besides using a singular layer can be used. In this process the rotating pins penetrate partially into the surface of first workpiece to execute the various desired motions involving x-direction motion and the oscillations as stated previously. The depth of penetration is selected by the user and the height of the pins for the multi-pin head can be made to conform to the desired penetration depth.

An extension of the two-pin arrangement is a three-pin or more pin arrangement as presented in another example of the invention. In this example, the plasticized material is forced to flow in an oscillating mode in curved (sinusoidal) paths hugging the three pins. With slight transverse oscillations of the pins assembly a larger shear path results, and excellent mixing of matter across the interface is ensured. Joining without porosity is significantly enhanced by this approach. Using the multi-pin approach, extreme grain refinement can be achieved rapidly as metal grains are repeatedly subdivided by being sheared along multiple tortuous sinusoidal paths between three or more pins.

Although a composite-like material is created by a multi-pin process when a second phase is added to metal workpiece, the shear traction and accompanying flow of matter lead to welding at the interface or interfaces between dissimilar materials such as: (i) particles, which may be a non-metal, a compound or a different metal, and may be present in numerous pieces at a time, and (ii) the first workpiece which is generally a metal but it can be any other substance, by following the basic principles applied to the joining of interfaces for similar types of metals as taught in this invention. The swirling action of reinforcing powder particles added to the surface, along a sinusoidal shearing path between three or more pins can uniformly mix the fine particulates without agglomeration. This goal cannot be achieved by using a single pin tool, which would lead to agglomeration of particles due to the stiffer response of the material surrounding the plasticized metal. The present cluster of multiple pins in close proximity also provides high rigidity to the apparatus as a unit to prevent fracture of the smaller diameter pins.

Figure 3:
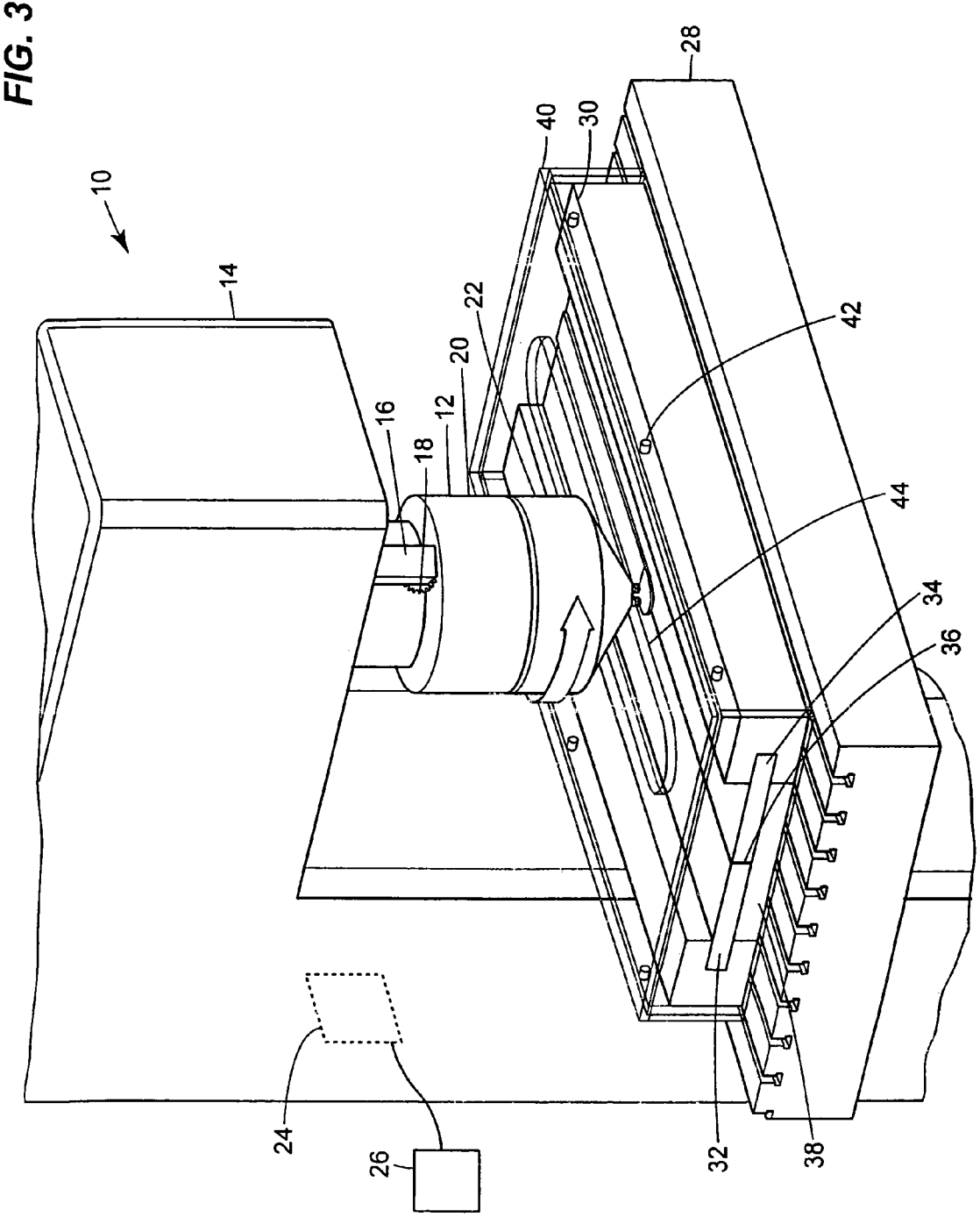
FIG. 3 shows a friction driven stitch welding apparatus.

Referring now to FIG. 3, a friction driven stitch welding machine 10 is shown. In this example, the welding machine 10 includes a welding head 12 that is mounted to a milling machine 14. An oscillation motor 16 is mounted on the milling machine 14 with a motor output shaft (not shown) attached to a oscillation motor spur gear 18. The spur gear 18 is coupled to the fixed housing of welding head 12 and can impart small oscillations to the welding head 12 to rotate the welding head 12 about the central axis (Z axis) of the milling machine 14. The welding head 12 includes a housing 20 and a rotary housing 22. The welding head 12 will be more fully described herein. A programmable controller 24 controls the power output of the milling machine 14 and the operation of the oscillation motor 16. An input device 26 is connected to the controller 24 such that a user can input variables for programmable control necessary to optimize the welding process. As used herein, the controller 24 can be a single controller controlling all devices, or the controller 24 can be the several separate controllers each independently controlling one or more devices.

The welding machine 10 also includes a table 28 and a fixture 30 disposed on the table 28. The table 28 is movable in both the +/– X direction and the +/– Y direction. Motorized slides (not shown) provide X and Y motions of the table 28 which are standard in the industry. The motorized slides can either be coupled to the controller 24 or, again, can have their own programmable controls. The fixture 30 is adapted to securely hold a first workpiece 32 and a second workpiece 34 during the welding process. The first workpiece 32 and the second workpiece 34 are shown to meet at an interface 36 for a butt weld. The fixture 30 also includes a heated backup plate 38 which supports the workpieces 32, 34 from underneath and also heats the workpieces 32, 34 to a desired preselected temperature to aid in the welding process. Finally, an inert gas chamber 40 can enclose the fixture 30, heated backup plate 38, and workpieces 32, 34, when necessary. The chamber 40 includes several inlets 42 to which an argon gas source can be connected and a slot 44 through which the welding head 12 traverses. The chamber 40 is fitted on the top with an adaptable sliding cover (not shown) which maintains the slot 44 in a partially sealed condition as the welding head 12 moves forward and back, to assure that the pressure of the inert gas within the chamber 40 remains positive. Argon can be continuously pumped into the chamber 40 during the welding process to purge the chamber 40 from oxygen to protect the workpieces 32, 34 from oxidation during the welding process. The argon escapes the chamber 40 through the slot.

During the welding process, the welding head 12 is disposed over the interface 36 between the two workpieces 32, 34. The oscillation motor 16 can be used to make small perturbations to the traverse path of the welding head 12 by rotationally altering the location where the welding head 12 enters and leaves the workpiece interface 36. The milling machine 14 provides rotational energy to the welding head 12. The motorized slides move the table in the +/– X direction and the +/– Y direction during the welding process to provide the desired path of the welding head 12 relative to the first and second workpiece 32, 34. The welding head 12 welds the two workpieces 32, 34 together along the interface 36 as will be more clearly discussed herein. The combination of the +/– X movement and the +/– Y movement can impart the stitching motion as will also be more clearly discussed herein.

Figure 4:
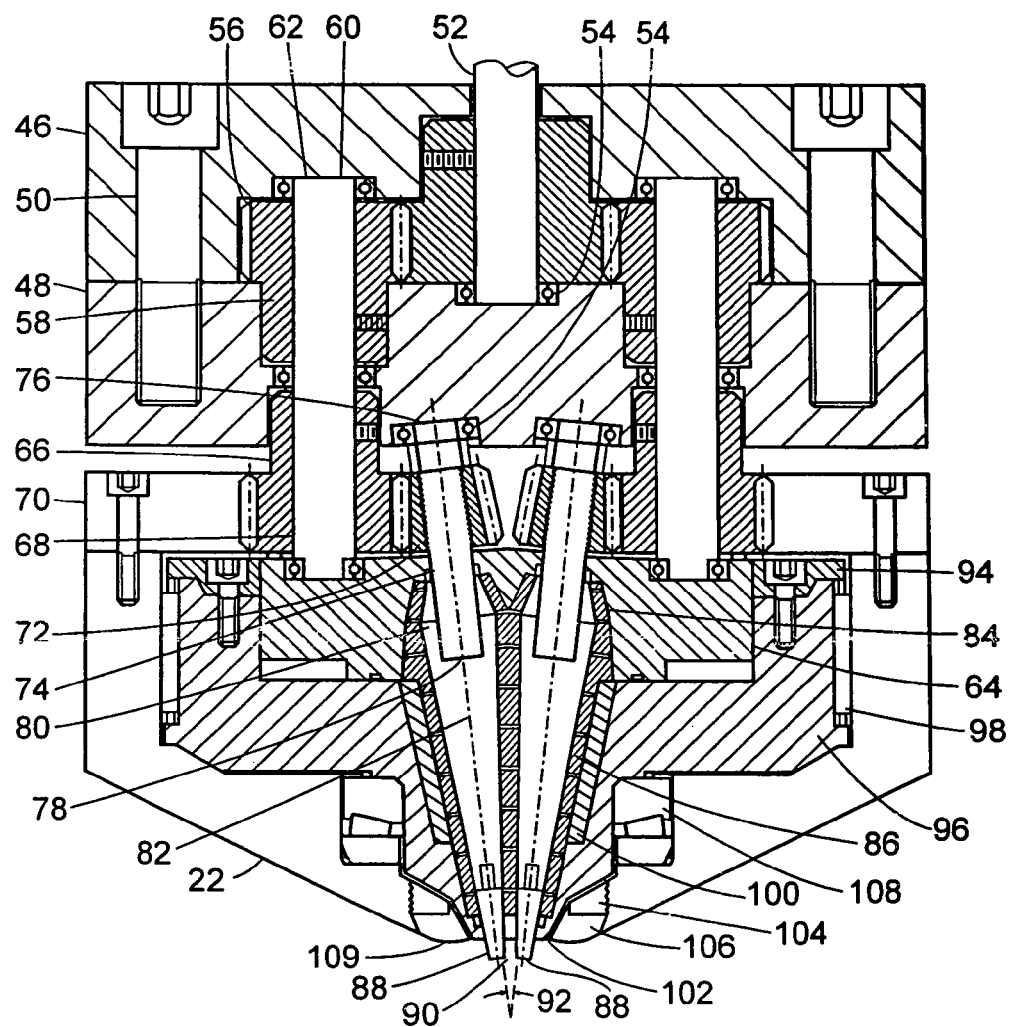
FIG. 4 shows a cross sectional view of a head of the friction driven stitch welding apparatus of FIG. 3.

Referring now to FIG. 4, the welding head 12 of the FDSW machine 10 is depicted. The housing 20 includes a first fixed part 46 fastened to a second fixed 48 part by a plurality of bolts 50. A first drive shaft 52 is coupled to the milling machine 14 and extends through the first fixed part 46, and terminates in a recess in the second fixed part 48 and is supported in the second fixed 48 part by a bearing 54. In this example, the first drive shaft 52 is integral with the welding head 12, and is connected to a receiver (not shown) of the milling machine 14. In other examples, the first drive shaft 52 can be a part of the milling machine 14. A first spur gear 56 is fastened to the first drive shaft 52 and engages second spur gears 58 which are each fastened to upper ends 60 of second drive shafts 62. The second drive shafts 62 extend from the first fixed part 46, through the second fixed part 48, and terminate at a third fixed part 64. The second drive shafts 62 are supported on both ends and in the middle by bearings 52. Third spur gears 66 are fastened to lower ends 68 of the second drive shafts 62 and drive both a planetary gear 70 and bevel gears 72.

The bevel gears 72 are fastened to bevel gear shafts 74 which are disposed at an angle relative to the first and second drive shafts 52, 62. The bevel gear shafts 74 terminate at an upper end 76 in the second fixed part 48 and are supported thereat by bearings 52. The bevel gear shafts 74 are fastened at their lower ends 78 to the upper ends 80 of a pair of spindles 82. The spindles 82 are disposed in upper sleeve bushings 84 and lower sleeve bushings 86. Tool tips in the form of a pair of pins 88 are attached to the lower ends of the spindles 82. The pins 88 are mounted to define a gap 90 therebetween with a spacing of, in this example, between 2.5 mm and 4 mm. The alignment of the bevel gears 72 controls the gap 90. An inclination 92 of each pin 88 from the vertical orientation should be between 2-8° to create required spacing between the tips of the pins 88 at the location of closest approach. Other angles 92 (including 0°) and other gaps 88 may be used in different applications. If the gap 88 is increased, then the angle of inclination 92 can be reduced.

A retainer ring 94 is affixed to a fourth fixed part 96. The retainer ring 94 and the fourth fixed part 96 support a plurality of needle bearings 98. The second fixed part 48, third fixed part 64, and fourth fixed part 96 are all affixed by a plurality of bolts (not shown) to create a rigid assembly.

A fifth fixed part 100 is disposed in the fourth fixed part 96 and supports the lower sleeve bushings 86. The fifth fixed part 100 can be precision machined to ensure that the pins 88 are rigidly supported and in the proper orientation. The fifth fixed part 100 further bears the lateral force of the pins 88 plowing through the workpieces 32, 34.

The rotary housing 22 is fastened planetary gear 70 and has a central opening 102 at its lower end. A tool tip retainer 104 and a rotating shoulder ring 106 are disposed in the central opening 102. The plurality of needle bearings 98 provide lateral support to the rotating housing 22, and thrust bearings 108 are provided between the fourth fixed part 96 and the rotating housing 22 to provide axial support.

The rotating shoulder ring 106 is not flat on the workpiece surface but has a slightly curved annular surface 109 to generate high local pressure. Its curvature is specially controlled to provide a more gentle curvature on the outer side of the ring than toward its center. The shoulder ring 106 generates heat by friction against workpiece, softens the metal and contains the softened metal during joining. The shoulder ring 106 puts higher pressure on the contacted region of the workpiece causing metal to rise slightly toward the center of the ring. As the shoulder ring passes over metal that has been already joined or processed, it flattens the risen metal by pushing it down. This enhances the strength of the joint by closing any pores that might tend to form by the stirring action of the metal. Since the shoulder ring 106 has to withstand high friction, high pressure and, high heat, it is periodically replaced when damaged. A back side of the shoulder ring 106 connected to the tool tip retainer 104 is designed as non-circular and precision machined for locking into place, and then retained by the tool tip retainer 104 from the back. When the shoulder ring 106 becomes worn or damages, it is easily replaced. In the disclosed device, the shoulder ring 106 is used to soften metal locally and exert pressure on the joined metal to flatten it, and oscillatory motion of the pins 88 cause further softening of the metal by introducing a transverse stress in addition to the shear stress. The combined stress state causes additional softening in the work zone and assists in joining.

The entire assembly is completely supported internally with essentially no gaps in between. The spindles 82 are free to rotate, but support all normal loads on all internal surfaces through bushings 84, 86 and bearings 52. The whole assembly acts as one rigid unit. All internal space contacting the spindles 82 is under pressurized lubricant and coolant which share in supporting the load.

As disclosed herein, the welding head 12 is adapted to be retrofitted onto an existing milling machine 14. However, one of ordinary skill could easily see other structures and methods of providing control and power to the disclosed welding head 12 to create a welding process as described herein.

Figure 5:
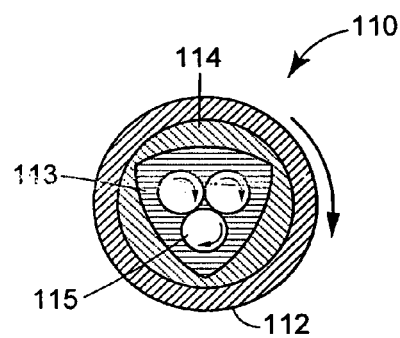
FIG. 5 shows an alternative three pin design particularly useful in surface treatment of metals.

While a two pin welding head 12 is shown in FIG. 4, one of ordinary skill in the art would easily understand how to add a third pin and its related gears, shafts, spindles, and bushings to the welding head to achieve the three pin welding head mentioned above. In another example, shown schematically in FIG. 5, a three pin welding head 110 may be driven by a planetary gear (not shown) similar to the planetary gear 70 in FIG. 4. The planetary gear is connected with the outer rotating ring 112 in FIG. 5, that surrounds fixed part 114, which houses the bushings 113 and spindles 115 similar to the construction discussed in regard to FIG. 4.

In use, the first drive shaft 52 rotates the second drive shafts 62 through the first and second spur gears 56, 58. The second drive shafts 62 then rotate the bevel gear shafts 74 through the third spur gears 66 and the beveled gears 72. The bevel gear shafts 74 rotate the spindles 82 and the pins 88. The pins 88 rotate in the same rotational direction. However, at their closest location in the gap 90, the pins 88 rotate in opposite direction relative to each other. In other words, in the gap 90 between the pins shown in FIG. 4, one of the pins 88 has a direction into the page, and the other of the pins 88 has a direction out of the page. At the same time the third spur gears 66 are driving the planetary gear 70, which then rotates the rotary housing 22.

Figure 6:
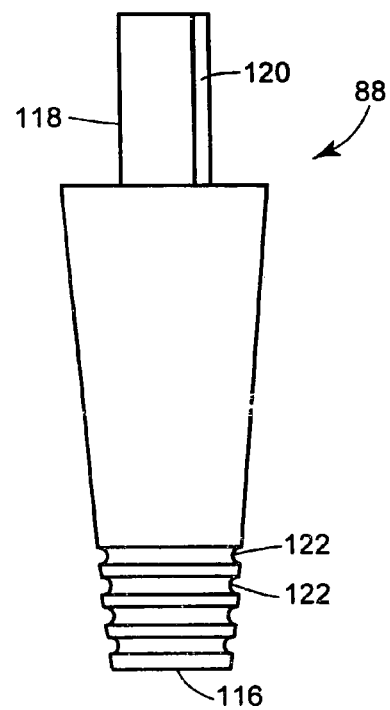
FIG. 6 shows a side view of a pin used in the head of FIG. 4.

Referring now to FIG. 6, one of the pins 88 is shown. The pin 88 is removable from the spindle 82 to so that it is easily replaceable after it becomes worn. The pin 88 may be removably fastened in the spindle 82 with a chuck, a set screw, or other locking mechanisms. The pin 88 has a slightly conical shape with a flat end 116 and a shaft 118 extending out the end opposite the flat end 116. The shaft 118 may be inserted into a spindle 82 and includes a flat side 120 so that the spindle 82 may transfer the rotational power to the pin 88. The pin 88 includes a series of recesses 122 extending its circumference. The recesses 122 permit excess metal in the deformation zone so that high pressure generated in the volume of metal under the shoulder ring 106 is partly relieved. It is possible to construct the pins 88 from hard materials, such as tungsten alloys or from hardened steels. Damage to apparatus is reduced because the force of plowing is internally distributed over all of the surfaces of the pins 88.

Figure 7:
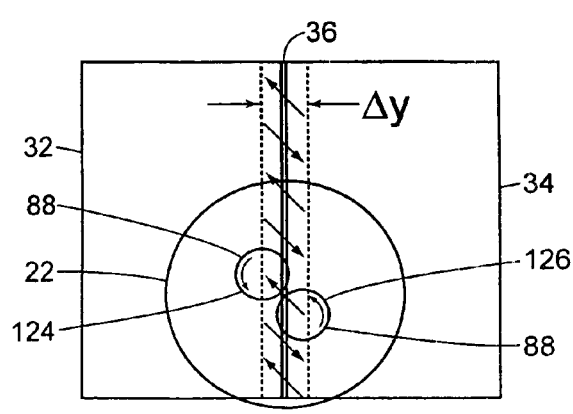
FIG. 7 shows an overhead view of the head of FIG. 4 and two parts to be welded.

Referring now to FIG. 7, a schematic diagram shows the pins 88 and shoulder ring 106 relative to a pair of workpieces 32, 34 to be joined. Again, the pins 88 rotate in the same direction at the same speed, but in the opposite sense with respect to the confined workpiece so that they shear workpiece metal at the interface while forcing it across the apparatus interface 36. The leading pin 124 is called the "Leader," the other pin 126 the "Follower," but both move together essentially along the same direction, with the weakest region of the workpiece sandwiched in between. This staying together of the two pins 88 makes them act as a unit and provides rigidity even when each pin 88 is somewhat slender in diameter.

The joining process starts by first having a keyhole on each side of the joining interface (i.e., one pin in each piece to be welded), but oriented at roughly 45° to the interface 36 plane for efficient shear transfer of metal. In a first path shown in FIG. 6 and shown more particularly in FIG. 7, in a first leg 128, the Leader 124 first moves deeper into its side in a first diagonal direction, while the Follower 126 pin crosses the interface 36 in the same direction. Once the gap 90 between the two pins 88 has crossed the interface 36, in a second leg 130, the welding head 12 moves a small distance in the X-direction. In a third leg 132, the welding head 12 moves relative to the interface 36 in a second diagonal direction opposite to the first diagonal direction. Once the gap 90 between the pins 88 has again crossed the interface 36, the head 12 then moves in the X-direction again in a fourth leg 134. The cycle then begins again. These motions stated as diagonal direction are not strictly at 45° to the interface but may constantly change direction depending on how x-motion and y-motion are programmed. The programmed path is a function of workpiece material. The departure between directions of apparatus motion across the interface 36, and the line joining the axis of rotation of the two pins 88, determine the extent of travel along the x-direction.

In FIGS. 7 and 8, apparatus motion normal to the thin deforming volume of metal is illustrated. The back and forth motion across interface continues while the head moves forward along the weld direction (x), simulating a stitching action. An apparatus of this type having a rotating double-pin head, with the ability to control motion in the x-direction (along the weld), y-direction (transverse to the weld in-plane), and also θ-direction (for small oscillatory rotations about z-axis, rocking motion), during the process is envisioned. The various types of motions and oscillations proposed are directly linked with the well-known laws of cyclic plasticity and softening of the metals which significantly reduces force on the apparatus by as much as 50%. FIGS. 9 and 10 depict alternate paths the welding head 12 may take through the workpieces 32, 34 and across the respective interfaces 36 between the workpieces 32, 34. With particular reference to FIG. 10, oscillatory rotational motion is applied to the welding head 12 (about the z-axis) during the welding process, the direction of the line joining the centers of the two pins 88 continuously changes its orientation relative to the orientation of the workpiece interface 36 being welded. Other welding paths will be seen to those of skill in the art.

On the basis of this understanding, a double-pin tool 12 with two pins 88 counter-rotating in relation to the small gap between them to confine, deform, and transfer material across the interface is disclosed. A schematic illustration of a two-pin tool, and the intensified strain in the deformation zone 135, is shown in FIG. 11. This configuration requires far less energy to heat this thin region. However, there are additional energies associated with plowing through the material with two pins 88 rather than one. To minimize the contribution of this energy, travel of the apparatus through the workpiece is significantly modified, in a stitching-motion, as disclosed herein.

In the disclosed apparatus, each pin 88 in the assembly of pins is smaller in diameter and their rotational speed is maintained lower than that of a comparable single pin tool. While the assembly of pins as a whole maintains desired rigidity of the apparatus head, the reduction of pin tool diameters is afforded by the weakening of the portion of workpiece material undergoing plasticizing, with repeated alternations in shear axis. The volume of the weakened plasticized zone is now proportionally a much larger fraction than a corresponding zone of a single pin tool.

The gap 90 between the pins 88 is maintained small such that the local shear strain rates within the gap region due to counter rotation of the pins 88 become many fold greater compared to the single pin tool, i.e., the flow and mixing of atoms from the two workpiece surfaces occurs at a far greater shear rate. The local strain rate in the gap 90 due to superposition of shear rates from the two pins 88 is approximately proportional to 2R/a times that for a single tool, which can be of the order of 20 (R=pin tool radius, a=gap width), not simply two times. This feature enables slowing the overall rotational speeds of the pins 88 and minimizing damage to the pins.

In the present friction-driven stitch-welding (FDSW) process using a double-pin application, softening and flow of this constrained material occurs and an overall lower force on the apparatus and lower temperature of the pins 88 prevails for the same or similar welding speed, even though a second pin is involved, which follows the Leader 124 into a highly softened region. Apart from cyclic plasticity, a multi-axial state of stress involving repeated changes in the direction of shear also causes strain softening of the workpiece material at elevated temperature, based on previous elevated temperature experiments. Thus, proposed stitching traverse motions are unique in FDSW process. The force experienced by the pins 88 can be measured by placing a quartz dynamometer in line with the milling machine.

The above multi-pin configuration can be beneficial in more than one way. An observation in the present FSW process is that porosity and cracks often are present near the lower portion of the thermomechanically processed zone, close to the elastic-plastic boundary. This is another detrimental result of plastically deforming material unevenly very far from the pin surface or the region of higher temperature. Smaller multiple pin systems with higher local shear rate can potentially solve this problem.

In another example, the disclosed FDSW process can be used in a lap welding process. In lap welding, instead of two edges butting up against one another, two faces of sheets can overlap. In other words, a first workpiece is disposed laying on top of a second work piece. The pins can be disposed through the overlapping sheets and the process described above can be performed to weld the two workpieces together in a lap weld.

Figure 12:
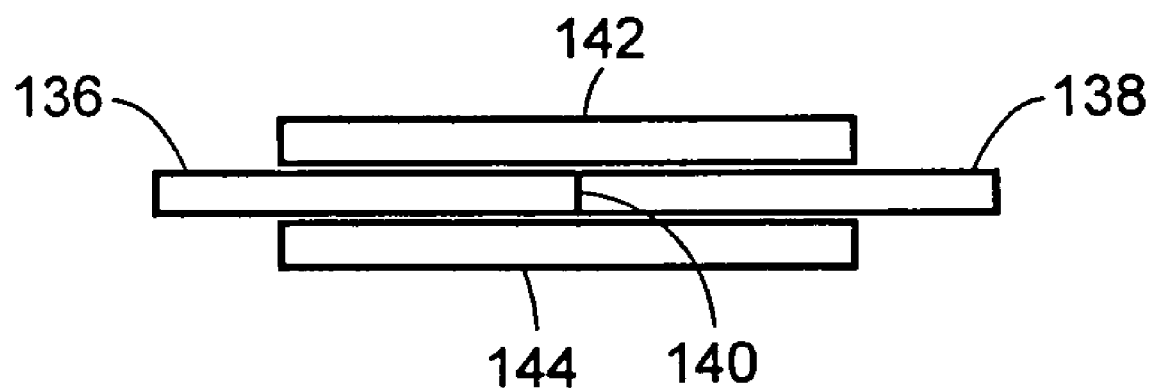
FIG. 12 shows an alternative process useful with the welding head of FIG. 4.

In another example shown in FIG. 12, the disclosed welding head can be used to create a combined butt and lap weld. In this example, a first workpiece 136 and a second workpiece 138 are disposed against one another to form an interface 140, similar to that disclosed in FIGS. 1 and 6. Next, a third workpiece 142 and a fourth workpiece 144 are disposed above and below the interface 140, respectively. The welding head 12 is plunged through the third workpiece 142 to the interface 140 and driven as described above. This process forms a combined butt and lap weld. To further strengthen such joint by creating a composite-like microstructure, the workpiece elements in the vicinity of the joint can be coated with ceramic particles such that rotation and mixing caused by the multiple pins can incorporate the particles into the metal while making a joint through the plurality of workpieces. This produces a particulate-reinforced strong joint.

Friction Stir Processing ("FSP") for surface alloying with nanostructured coatings or creating wear-resistant and corrosion-resistant coatings requires mixing of second phase particles on the surface of the metals. For this purpose, penetration of the pins 88 may be small and forces on the apparatus are lower. But mixing of fine (nanometer size) particulates uniformly pose a major challenge and apparatus damage from abrasive particles can be a problem as well.

A present multi-pin surface plowing/mixing application can be very effective in creating several narrow channels between the pins to rapidly mix and extrude workpiece grains with the particles and disperse them efficiently through the workpiece surface. This provides a means to eliminate agglomeration of fine particles during mixing which is traditionally a problem with mixing particulates in a metal matrix in the solid state.

One nonlimiting metallurgical application in the FSP area is to coat nanoparticles of YAG or alumina on the surface of aluminum or steel. With coating on aluminum, surface properties similar to or exceeding that of titanium are possible, without fear of forming distinct intermetallic layers, but to enjoy the benefits of a graded composition. Another application is to mix mechanically alloyed Al-YAG powder on the surface of steel or Ni base alloys to initiate mild exothermic chemical reaction synthesis in order to embed and form a coating of intermetallic composite as a graded layer. A third possibility is to embed particles of Ti and B, and convert them into nanodisks of $TiB_2$ during the FSP process.

Another important application for the above-described novel multi-pin FDSW process head, when used for processing the surface and interior of a metal, is leading to provide highly refined grain structure in metals. Such highly refined structure can be approached by a process of severe plastic deformation imparted to the metal. Similar to FDSW process which uses local shearing within metals under high hydrostatic pressure, a less efficient process was devised to allow grain fragmentation and show the potential for grain refinement. This effort shows the process feasibility to produce such materials and/or components produced from such materials. In particular, a warm compression test in which a piece of Ti alloy having 30-50 micron size grains was allowed to undergo reduction in height and shear deformation while it was maintained under a pressure of 1.5-2 GPa. When the process is conducted at 450-500° C., 100-200 nm size grains were produced.

It is believed that FDSP is far more efficient than the prior art single pin process, and is capable of producing such materials with relative ease and at much higher speed which reduces costs. Certain heat treatments assist in the process of grain fragmentation. It was found that for Ti-6Al-4V alloy, a prior beta heat treatment followed by water quenching created long thin needle-like transformed beta phase within the structure that can be fragmented at high efficiency and uniformity, i.e., all grains fragment with equal ability. Etching of this material reveals that certain grains protrude from the surface on an extremely fine scale. The preferential etching is a result of the initial composition of the alloy, and the temperature of severe deformation process. Protruding grains have the capability to provide natural rough and undulating surfaces for bone cells or tissue cells to adhere to and grow.

Figure 13:
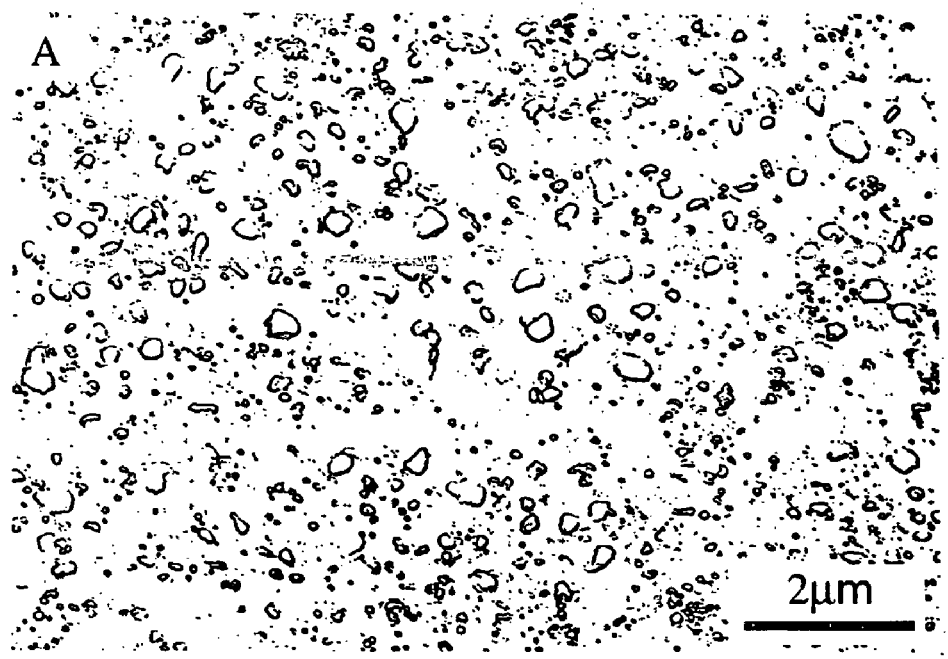
FIGS. 13 and 14 depict titanium microstructure in ultrafine grain condition.
Figure 14:
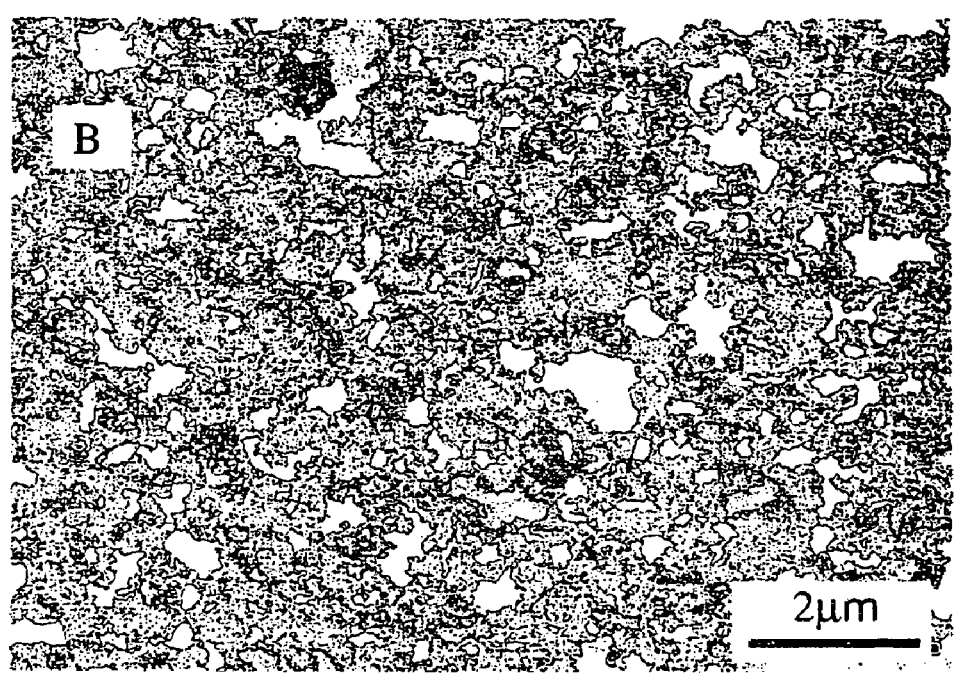

Because these dimensions are close to the size of the long-chain molecules of human tissues and cells, such structures are highly effective in biomedical applications. Many naturally occurring features within human body are of this size. The attached FIGS. 13 and 14 show one of the titanium phases that is less affected by the etchant, and that protrudes from the surface. Initially, the size of these protruding grains is about 100 nm, but with annealing treatment at elevated temperature they grow in size. Thus, the present process is capable of producing feature sizes over a wide range from nanometers to microns.

When titanium alloys with nanograin structure are created, pulsed laser hole drilling in periodic locations can produce very fine porous structures having protrusions from surfaces that have the scales of natural biological systems. Ideally, this is prepared by femtosecond laser which produces no damage or heat-affected zone. Thus, no change in the size of these grains is expected. The treated materials then are etched to create the surface protrusions for adherence. Furthermore, when the disclosed FSP method is used to embed fine particles of hydroxyapatite or bioglass on the surface of titanium, the adherence of tissues and bone cells is almost natural because of the high level of biocompatibility. The nanograin titanium is twice as strong and damage tolerant in comparison to conventional titanium. Thus, bone scaffolds made from these materials can be thinner thereby reducing the extent of foreign material in the human body, and lasting longer without failure. Because of their smaller mass, these material systems also are applicable to other parts of the body than just suitable as bone scaffolds. Furthermore, similar applications are possible for NiTi (nitinol), which is currently used in stents. A coating of hydroxylapatite on a thinner NiTi can produce a more biocompatible, and somewhat biodegradable, stent material, which is not currently possible with metallic stents.

Although certain aspects of a friction driven stitch welding apparatus and method have been described herein, in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A process of solid-state welding using a welding apparatus with a head, the head including a ring-shaped rotatable shoulder, a first pin and a second pin, both pins extending downwardly relative to the shoulder and not integrally connected to the shoulder, the process comprising:
   coupling a first workpiece to a table;
   coupling a second workpiece to the table and against the first workpiece to form an interface between the first workpiece and the second workpiece, the interface defining an X direction, wherein a Y direction is perpendicular to the X direction and parallel to the plane of table, and a Z direction is defined as perpendicular to the plane of the table;
   rotating each of the first pin and the second pin about a separate, spaced non-parallel axis of rotation with a gap defined therebetween, the axes of the first and second pins being inclined toward each other to intensify the shear strain of the interface within the gap;
   rotating the ring-shaped shoulder disposed about the first and second pins relative to the first and second pins in their entirety, the pins rotating about non-parallel axes of rotation relative to the shoulder with the ring-shaped shoulder bearing downwardly against the first and second workpieces;
   moving the head along the interface, with the shoulder bearing downwardly against the first and second workpieces and the first and second pin disposed in the first and second workpieces; and
   directing the first pin and the second pin repeatedly across the interface in a back and forth stitching motion between the first and second workpieces to form a solid state weld between the first and second workpiece.

2. The process of claim 1, further comprising rotating the first pin and the second pin in the same direction about their separate axes of rotation.

3. The process of claim 2, the first pin having a first diameter, and first pin and the second pin having a gap therebetween, further comprising providing the gap to be less than or equal to the first diameter.

4. The process of claim 1, further comprising disposing the axis of rotation of the first pin and the axis of rotation of the second pin along a reference line, wherein the reference line defines an approximate 45° angle to the interface.

5. The process of claim 4, further comprising directing the first pin and the second pin travel in the direction of the reference line across the interface.

6. The process of claim 1, further comprising directing the first pin and the second pin in a direction parallel to the interface.

7. The process of claim 4, further comprising continuously changing the orientation of the reference line with respect to the interface during the welding process.

8. The process of claim 1, further comprising heating the workpiece to a desired temperature with a heater on the table underneath the workpiece.

9. The process of claim 1, further comprising moving the table in both the X direction and the Y direction so as to permit the pins to move across the interface as close to a perpendicular direction as possible.

10. The process of claim 1, further comprising moving the welding head in both the X direction and the Y direction.

11. The process of claim 1, further comprising moving the welding head in an oscillatory manner about the Z direction while moving along either X direction or Y direction, or both X and Y directions simultaneously.

12. The process of claim 1, further comprising disposing the first pin and the second pin substantially but not entirely through the first and second workpiece.

13. The process of claim 1, further comprising providing the first pin and the second pin at an angle of approximately 5° from vertical.

14. The process of claim 1, further comprising providing the first pin and the second pin at an angle between 1° and 8° from vertical.

15. The process of claim 1, further comprising rotating the rotatable ring-shaped shoulder at a rotational speed less than or greater than the rotational speed of the first pin.

16. A process of solid-state joining using a welding apparatus with a head, the head including a ring-shaped rotatable shoulder, a first pin and a second pin, both pins extending downwardly from the shoulder and not integrally connected to the shoulder, the process comprising:
   coupling a first workpiece to a table, the workpiece including an upper surface;
   disposing a second workpiece on the upper surface of the first workpiece to define an interface between the first and second workpiece;
   defining an X direction on the table wherein a Y direction is perpendicular to the X direction and parallel to the plane of table, and a Z direction defined as perpendicular to the plane of the table;
   rotating each of the first pin and the second pin about a separate, spaced non-parallel axis of rotation with a gap defined therebetween, the axes of the first and second pins being inclined toward each other to intensify the shear strain of the interface within the gap;

rotating the ring-shaped shoulder disposed about the first and second pins relative to the first and second pins in their entirety, the pins rotating about non-parallel axes of rotation relative to the shoulder with the ring-shaped shoulder bearing downwardly against the first and second workpieces;

penetrating the first and second pins through the second workpiece and partially into the first workpiece; and moving the head along a path that contains the interface in a back and forth stitching motion between the first and second workpieces, with the shoulder bearing downwardly against the second workpiece such that the first pin and second pin mix the first and second workpieces, to form a solid state bond between the first and second workpieces.

17. The process of claim 16, wherein the second workpiece is a metal plate, sheet, block, or part.

18. The process of claim 16, wherein the second workpiece is an aggregate of particulate.

19. The process of claim 18, wherein the particulate is ceramic or metal.

20. The process of claim 18, the head including a third pin equidistant from the first and second pins, the process further comprising moving the head along a predetermined set of paths with the third pin disposed into the first workpiece below its upper surface along with the other two pins, such that the first, second, and third pins mix the particulate with the workpiece to form a solid state weld between the workpiece and the particulate.

21. The process of claim 20, further comprising all three pins having the same diameter.

22. The process of claim 20, further comprising mixing the particulate in a sinusoidal path.

23. The process of claim 20, further comprising mixing the particulate confined to a certain depth below the upper surface of first workpiece.

24. The process of claim 16, further comprising coupling a third workpiece to the table and butting the third workpiece against the first workpiece to form a butted interface, the X direction disposed along a butted interface, wherein the first, second, and third workpieces create a combined butt and lap joint.

25. The process of claim 16, further comprising having workpiece interfaces only parallel to the plane of the table to create only seam joint or lap joint through the thickness.

26. The process of claim 16, further comprising rotating the first pin and the second pin in the same direction about their separate axes of rotation.

27. The process of claim 16, the first pin having a first diameter, and first pin and the second pin having a gap therebetween, further comprising providing the gap to be less than or equal to the first diameter.

28. The process of claim 16, further comprising disposing the axis of rotation of the first pin and the axis of rotation of the second pin along a reference line, wherein the reference line defines an approximate 45° angle to the direction of travel of the head.

29. The process of claim 28, further comprising directing the first pin and the second pin travel in the direction of the reference line across any of the interfaces to be joined.

30. The process of claim 28, further comprising continuously changing the orientation of the reference line with respect to the interface during the welding process.

31. The process of claim 16, further comprising directing the first pin and the second pin in a direction parallel to the interface.

32. The process of claim 16, further comprising moving the table in both the X direction and the Y direction.

33. The process of claim 16, further comprising heating the first workpiece to a desired temperature with a heater on the table underneath.

34. The process of claim 16, further comprising moving the welding head in an oscillatory manner about the Z direction while moving along either X direction or Y direction simultaneously.

35. The process of claim 16, further comprising disposing the ring-shaped rotatable shoulder against the workpiece surface to frictionally heat workpiece to soften it sufficiently to prevent crack formation during the joining process.

36. The process of claim 16, further comprising disposing the ring-shaped rotatable shoulder against the workpiece surface sufficient to resist upwelling of workpiece.

37. The process of claim 16, further comprising providing the first pin and the second pin at an angle of approximately 5° from vertical.

38. The process of claim 16, further comprising providing the first pin and the second pin at an angle between 1° and 8° from vertical.

39. The process of claim 16, further comprising rotating the rotatable ring-shaped shoulder at a rotational speed less than or greater than the rotational speed of the first pin.

40. A process of solid-state grain refinement of materials using a multi-pin apparatus with a head, the head including a ring-shaped rotatable shoulder, a first pin, a second pin, and a third pin, all pins equidistant from one another and extending downwardly from the shoulder and not integrally connected to the shoulder, the process comprising:

coupling a workpiece to a table, the workpiece including an upper surface;

defining an X direction, wherein a Y direction is perpendicular to the X direction and parallel to the plane of table, and a Z direction defined as perpendicular to the plane of the table;

rotating each of the first pin, the second pin and the third pin about a separate, spaced non-parallel axis of rotation with a gap defined therebetween, the axes of the first and second pins being inclined toward each other to intensify the shear strain of the interface within the gap;

rotating the ring-shaped shoulder disposed about the first and second pins relative to the first and second pins in their entirety, the pins rotating about non-parallel axes of rotation relative to the shoulder with the ring-shaped shoulder bearing downwardly against the first and second workpieces;

penetrating the first pin and the second pin through the upper surface of the workpiece to a desired depth;

moving the head along a path or series of paths in a back and forth stitching motion on the workpiece predetermined to cover a desired region of surface and interior; and deforming and subdividing the grain structure of workpiece by said moving process.

41. A process of creating a high shear rate in a workpiece using a head including a ring-shaped rotatable shoulder, a first pin and a second pin, both pins extending downwardly relative to the shoulder and not integrally connected to the shoulder, the process comprising:

coupling the workpiece to a table;

rotating each of the first pin and the second pin about a separate, spaced non-parallel axis of rotation in the same direction, wherein the first pin has a diameter, wherein a gap between the first pin and the second pin is less than the diameter, the axes of the first and second pins being inclined toward each other to intensify the shear strain of the interface within the gap;

rotating the ring-shaped shoulder disposed about the first and second pins relative to the first and second pins in their entirety the pins rotating about non-parallel axes of rotation relative to the shoulder with the ring-shaped shoulder bearing downwardly against the first and second workpieces; and moving the head through the workpiece in a back and forth stitching motion, with the shoulder bearing downwardly against the workpiece and the first and second pin disposed in the first and second workpieces;

wherein the first pin rotates in a direction opposite the direction of the second pin in the gap to create a high shear rate of the workpiece within the gap.

42. The process of claim 1, rotating the shoulder at a rotational speed different than the rotational speed of the first and second pins so that the frictional heating of the workpieces may be controlled within a desirable range.

* * * * *